United States Patent [19]

Mori et al.

[11] 4,323,519

[45] Apr. 6, 1982

[54] METHOD OF WASHING ORGANIC SOLVENT SOLUTION OF POLYCARBONATE

[75] Inventors: Hazime Mori; Katsuhisa Kohyama; Katsuhiko Nakamura; Shinichi Takamatsu, all of Kita-Kyushu, Japan

[73] Assignee: Mitsubishi Chemical Industries, Ltd., Tokyo, Japan

[21] Appl. No.: 29,044

[22] Filed: Apr. 11, 1979

[30] Foreign Application Priority Data

Apr. 19, 1978 [JP] Japan .................................. 53/46093

[51] Int. Cl.$^3$ ............................................ C07C 68/02
[52] U.S. Cl. .................................... 528/499; 528/487; 528/490; 260/463; 524/464; 524/611
[58] Field of Search ............ 260/463, 33.8 R, 33.6 R, 260/30.4 R, 32.8 R; 528/487, 490, 499

[56] References Cited

U.S. PATENT DOCUMENTS

| | | | |
|---|---|---|---|
| 3,160,606 | 12/1964 | Dietrich et al. | 260/33.8 R |
| 3,663,727 | 5/1972 | Yamamoto et al. | 528/499 |
| 3,668,181 | 6/1972 | Oxeurider | 528/490 |
| 4,016,190 | 4/1977 | Bockmann et al. | 260/463 |

OTHER PUBLICATIONS

Z. Dobkowski et al., Chemical Abstracts: 85: 193320r (1976) Polycarbonates.

*Primary Examiner*—Donald G. Daus
*Assistant Examiner*—M. C. Eakin
*Attorney, Agent, or Firm*—Oblon, Fisher, Spivak, McClelland & Maier

[57] ABSTRACT

A crude organic solvent solution of a polycarbonate containing an impurity is washed with an aqueous washing liquid by forming a water in oil dispersed phase by mixing the crude solution of the polycarbonate with a small amount of aqueous washing liquid in order to form the water in oil dispersed phase and then causing a phase inversion from the water in oil dispersed phase into an oil in water dispersed phase, and then, separating the organic solvent solution of the polycarbonate from the aqueous washing liquid.

7 Claims, 1 Drawing Figure

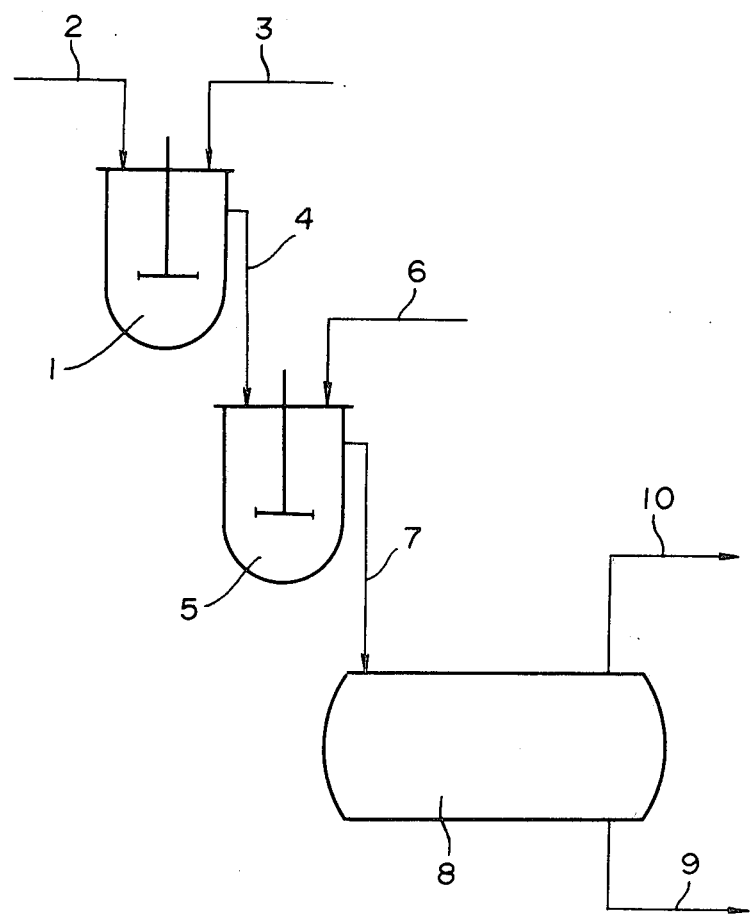
F I G. 1

METHOD OF WASHING ORGANIC SOLVENT SOLUTION OF POLYCARBONATE

BACKGROUND OF THE INVENTION

1. FIELD OF THE INVENTION

The present invention relates to a method for washing an organic solution of a polycarbonate (hereinafter referring to as polycarbonate solution). More particularly, it relates to a method for washing the polycarbonate solution containing an impurity, such as a crude polycarbonate solution produced by the phosgene method, with an aqueous washing liquid.

2. DESCRIPTION OF THE PRIOR ART

The polycarbonate solution obtained from a reaction system using the phosgene method contains impurities such as an alkali metal salt of the unreacted dihydroxy compound, residual amines used as the catalyst, alkali metal halides, alkali metal hydroxides and alkali metal carbonates. These impurities are incorporated with a small amount of water in the form of an emulsion. When the impurities remain in the product, a coloring of the product is disadvantageously caused. It is necessary to remove these impurities from the polycarbonate solution as described above.

In order to remove these impurities from the resulting polycarbonate solution, it is customary to carry out, in sequence, the following purification.

(1) Water washing to remove various impurities such as the alkali metal salt of the unreacted dihydroxy compound and other water soluble impurities.

(2) Washing with an acidic aqueous solution for neutralization of residual base or separation of amines used as the catalyst in a polymerization reaction.

(3) Water washing to remove excess acid from the acidic bath and water soluble impurities.

Thus, the impurities in the polycarbonate solution are found dissolved in the water incorporated in the water in oil dispersed emulsion.

As the emulsion dissolved impurities are relatively stable under alkaline conditions, the water washing in the washing operation (1) which is carried out under alkaline conditions, is not easy to carry out effectively. It has been especially difficult under industrial conditions to wash polycarbonate solutions having a high concentration of polycarbonate and high viscosity.

It has also been known to add a small amount of an aqueous washing liquid to the polycarbonate solution to disperse the aqueous washing liquid in the polycarbonate solution in the form of a water in oil dispersed phase. According to this method, the impurities incorporated in the polycarbonate solution in the form of an emulsion are dissolved in the aqueous washing liquid whereby excellent washing can be expected.

However, the time for separating the aqueous washing liquid in the form of water in oil dispersed phase from the polycarbonate solution by this method is too long to be suitable for an industrial operation.

It has further been known to wash the polycarbonate solution with a large amount of aqueous washing liquid.

In said case, the polycarbonate solution is dispersed in the aqueous washing liquid in the form of an oil in water dispersed phase. It is easy to separate the aqueous washing liquid from the polycarbonate solution. However, elution of the impurities in the form of an emulsion into the aqueous washing liquid is remarkably slow whereby it is difficult to attain satisfactory washing effect.

The inventors have found a more effective method for washing the polycarbonate solution. As the result, the inventors have found that the impurities can be effectively removed from the polycarbonate solution by the combination of certain steps.

In accordance with this method, satisfactory washing can be performed even though the concentration and viscosity of the polycarbonate solution are high or it is alkaline. Moreover, a satisfactory result can be attained even through the use of a simple apparatus such as a combination of a stirring vessel and a settler separator. The present invention has been attained by the following procedures.

SUMMARY OF THE INVENTION

It is an object of the present invention to provide a method for washing a polycarbonate solution by an industrially advantageous method.

The foregoing and other objects of the present invention have been attained by providing a method for washing a crude organic solvent solution of a polycarbonate containing an impurity with an aqueous washing liquid by (1) forming a water in oil dispersed phase by mixing the crude solution of the polycarbonate with a small amount of the aqueous washing liquid in order to form the water in oil dispersed phase, (2), causing a phase inversion from the water in oil dispersed phase into an oil in water dispersed phase and then, (3) separating the organic solvent solution of the polycarbonate from the aqueous washing liquid.

DETAILED DESCRIPTION OF THE PREFERRED EMBODIMENTS

The crude polycarbonate solution treated by the method of the present invention can be a crude polycarbonate solution discharged from a polymerization reaction system in the phosgene method, but is not limited to it. It can also be a crude polycarbonate solution washed by another method or a crude polycarbonate solution prepared by another method.

The polymerization reaction in the phosgene method means the conventional method wherein phosgene is reacted with an aqueous solution of an alkali metal salt of a dihydroxy compound in an organic solvent.

Suitable organic solvents include chlorinated hydrocarbons such as methylene chloride, dichlorobenzene, chloroform, tetrachloroethane, trichloroethane, dichloroethane, 1,2-dichloroethylene or a mixture of the chlorinated hydrocarbon and another solvent such as dioxane, tetrahydrofuran, acetophenone, toluene, xylene, cyclohexane, acetone or n-heptane.

It is preferable to use the chlorinated hydrocarbon or a mixture containing more than 60% by weight of the chlorinated hydrocarbon, especially methylene chloride.

Suitable dihydroxy compounds include 4,4'-dihydroxyphenyl-alkanes such as 4,4'-dihydroxydiphenyl-2,2-propane (bisphenol A), 4,4'-dihydroxydiphenylmethane, 4,4'-dihydroxydiphenyl-1,1-ethane, 4,4'-dihydroxydiphenyl-1,1-butane, 4,4'-dihydroxydiphenylcycloalkanes such as 4,4'-dihydroxydiphenylcyclohexane; 4,4'-dihydroxydiphenylsulfide; 4,4'-dihydroxydiphenylsulfone; 4,4'-dihydroxydiphenylsulfoxide; and halodihydroxy compounds which have halogen such as Cl and Br on the phenyl group of said compounds.

Suitable bases for forming the alkali metal salts of these dihydroxy compounds include strong basic hydroxides such as sodium hydroxide and potassium hydroxide.

The concentration of the polycarbonate in the polycarbonate solution is preferably in a range of 8 to 20 wt.% preferably 10 to 15 wt.%. When the concentration of the polycarbonate is too low, the amount of the polycarbonate solution is too great. Thus, the amount of the aqueous washing liquid is increased depending upon the amount of the polycarbonate solution. This is disadvantageous since a large size apparatus is required and a large amount of the solvent has to be distilled off to separate the polycarbonate.

On the other hand, when the concentration of the polycarbonate is too high, a gelation of the polycarbonate solution is easily caused and it is difficult to attain a stable washing operation.

Suitable aqueous washing liquids include water and dilute aqueous solutions of acid such as dilute aqueous solutions of hydrochloric acid and dilute aqueous solutions of phosphoric acid.

In general, water is used in the washing operation for removing an alkali metal salt of the unreacted dihydroxy compound. On the other hand, a dilute aqueous solution of acid is used in the washing operation for neutralizing it. Purified water is used in the washing operation for removing the residual acid.

In the method of the present invention, a water in oil dispersed phase is firstly formed by mixing the polycarbonate solution with a small amount of the aqueous washing liquid to form the water in oil dispersed phase.

The amount of the aqueous washing liquid is varied depending upon the concentration of the polycarbonate in the polycarbonate solution and the molecular weight of the polycarbonate and is selected from a range of 0.01 to 0.45 wt. fraction preferably 0.05 to 0.3 wt. fraction based on the polycarbonate solution.

When the amount of the aqueous washing liquid is too small, the washing effect is too low to attain the object of the present invention even though the water in oil dispersed phase is formed.

On the contrary, when the amount of the aqueous washing liquid is too great, an oil in water dispersed phase is formed which remarkably decreases the washing effect and the object of the present invention can not be attained.

The method for mixing the polycarbonate solution with the aqueous washing liquid is not critical so long as both solutions can be thoroughly mixed. A stirring vessel, multi-plated tower and other vessels or towers having a stirrer can be used for the mixing operation.

In the second step, the resulting mixture in the form of a water in oil dispersed phase obtained by the mixing is further mixed with the aqueous washing liquid suitable for forming an oil in water dispersed phase in order to cause a phase inversion into the oil in water dispersed phase.

The amount of the aqueous washing liquid used for the phase inversion is varied depending upon the amount of the aqueous washing liquid used for forming the water in oil dispersed phase in the first step, and is usually selected to give more than 0.3 wt. fraction preferably 0.3 to 1.0 wt. fraction of total aqueous washing liquid to the polycarbonate solution.

The phase inversion can be carried out by any mixing method so long as both of the solutions can be thoroughly mixed. The phase inversion can be carried out in the same apparatus used for forming the water in oil dispersed phase or in other mixing apparatus.

The mixture obtained by the phase inversion is further treated to separate the polycarbonate solution from the aqueous washing liquid. The phase separability of the mixture is improved by the phase inversion, whereby the phases can be easily separated by a conventional method using a settler separator, tower type separator or a centrifugal separator.

One embodiment of the method of the present invention will be illustrated referring to FIG. 1.

FIG. 1 is a schematic view of one embodiment of the apparatus used for the method of the present invention.

In FIG. 1, the reference numerals (1) and (5) designate stirring vessels; (2) designates an inlet pipe for feeding the polycarbonate solution; (3) and (6) designate inlet pipes for feeding the aqueous washing liquid; (4) and (7) designate overflow type outlet pipes; (8) designates a settler; (9) designates an outlet pipe for discharging the polycarbonate solution and (10) designates an outlet pipe for discharging the aqueous washing liquid.

The polycarbonate solution is fed through the inlet pipe (2) into the stirring vessel (1). The aqueous washing liquid is fed from the inlet pipe (3) to form the water in oil dispersed phase.

The dispersion discharged from the overflow type outlet pipe (4) of the stirring vessel (1) is fed into the stirring vessel (5). The aqueous washing liquid is fed through the inlet pipe (6) into the same vessel to cause a phase inversion into the oil in water dispersed phase.

The dispersion obtained by the phase inversion is fed through the overflow type outlet pipe (7) into the settler (8) wherein the polycarbonate solution is separated from the aqueous washing liquid. The polycarbonate solution is discharged through the outlet pipe (9) and the aqueous washing liquid is discharged through the outlet pipe (10).

In order to successively carry out the washing of the polycarbonate solution in multiple stages, the same type apparatus is used and the polycarbonate solution separated by the settler in the first stage is treated in the same manner.

One embodiment of the method of the present invention has been illustrated. Thus, the method of the present invention can be applied for washing the polycarbonate solution under alkaline conditions or acidic conditions or in water. In the method of the present invention, various kinds of the apparatus can be used in a continuous process or in a batch process.

In accordance with the method of the present invention, the impurities in the form of an emulsion in the polycarbonate solution are eluted into the aqueous washing solution by forming the water in oil dispersed phase and then, the phase separability is improved by causing the phase inversion to form the oil in water dispersed phase whereby the impurities are included in the continuous phase of the aqueous washing liquid and the washing of the polycarbonate solution can be effectively attained.

The polycarbonate solution can be washed without any trouble even though the concentration of the polycarbonate in the polycarbonate solution is high such as more than 10 wt.% or the washing is carried out under an alkaline condition. Therefore, the industrial advantage of the method of the present invention is remarkably high.

The present invention will be further illustrated by certain examples and references which are provided for purposes of illustration only and are not intended to be limiting.

In the examples, the term "%" means % by weight.

EXAMPLE 1 AND REFERENCES 1 AND 2

A purified polycarbonate powder having an average molecular weight of 22,000 was dissolved in methylene chloride to prepare 14% polycarbonate solution.

A crude polycarbonate solution was prepared by mixing 100 wt. parts of 14% polycarbonate solution with 0.5 wt. part of water containing 2.3% of sodium hydroxide and 3.0% bisphenol A.

500 Grams of the crude polycarbonate solution was charged in a 1 liter separable flask equipped with a baffle, and then 58 g of distilled water was added and the mixture was stirred by turbine blades at 600 rpm for 5 min.. The weight ratio of water to polycarbonate solution (hereinafter referring to as water phase ratio) was 0.15. A water in oil dispersed phase was produced.

Then, 167 g of water was added and the mixture was stirred by the same method for 5 min. The water phase ratio was 0.45. An oil in water dispersed phase was produced.

After the stirring, the mixture was transferred into a 1 liter separatory funnel and allowed to stand. The interfacial separation time and the content of bisphenol A in the separated polycarbonate solution were measured.

The results are shown in Table 1.

As the references, the following results are also shown in Table 1.

A water in oil dispersed phase having the water phase ratio of 0.15 was stirred and allowed to stand for separation.

An oil in water dispersed phase having the water phase ratio of 0.45 formed by adding a large amount of water, was stirred and allowed to stand for separation.

TABLE 1

| | Water phase ratio | Interfacial separation time (min) | Content of bisphenol A (ppm) |
|---|---|---|---|
| Exp. 1 | 0.15 + 0.3 | 11 | 13 |
| Ref. 1 | 0.15 | 63 | 22 |
| Ref. 2 | 0.45 | 11 | 70 |

In Table 1, the content of bisphenol A was measured by a colorimetry after coloring with titanium tetrachloride.

EXAMPLE 2 AND REFERENCES 3 AND 4

A crude polycarbonate solution having a concentration of 12% prepared by the process of Example 1 was used. In accordance with the process of Example 1, a phase conversion was caused from the water in oil dispersed phase into the oil in water dispersed phase at the water phase ratio shown in Table 2, and the dispersion was allowed to stand. The result was shown in Table 2.

As the references, the following results are also shown in Table 2.

A water in oil dispersed phase having the water phase ratio of 0.25 was stirred and allowed to stand for separation.

An oil in water dispersed phase having the water phase ratio of 0.45 formed by adding a large amount of water was stirred and allowed to stand for separation.

TABLE 2

| | Water phase ratio | Interfacial separation time (min) | Content of bisphenol A (ppm) |
|---|---|---|---|
| Exp. 2 | 0.15 + 0.3 | 8 | 9 |
| Ref. 3 | 0.25 | 36 | 14 |
| Ref. 4 | 0.45 | 8 | 63 |

EXAMPLE 3 AND REFERENCES 5 AND 6

In accordance with the process of Example 1 except varying the concentration of polycarbonate of the polycarbonate solution to 8.5% and varying the water phase ratio as shown in Table 3, the washing operation was carried out. The results are shown in Table 3.

TABLE 3

| | Water phase ratio | Interfacial separation time (min) | Content of bisphenol A (ppm) |
|---|---|---|---|
| Exp. 3 | 0.25 + 0.2 | 6 | 8 |
| Ref. 5 | 0.25 | 15 | 11 |
| Ref. 6 | 0.45 | 6 | 48 |

EXAMPLES 4 TO 6 AND REFERENCES 7 TO 12

A purified polycarbonate powder having an average molecular weight of 23,000 was dissolved in methylene chloride to prepare three kinds of polycarbonate solutions having a concentration of 14%, 12% or 8.5%.

Each crude polycarbonate solution (nitrogen content of 10 ppm) was prepared by mixing 100 wt. parts of each polycarbonate solution with 0.5 wt. part of a sodium hydroxide aqueous solution containing 1.4% of triethylamine at a pH of 12.

In accordance with the process of Example 1 except adding 0.15 N-HCl to each crude polycarbonate solution at each water phase ratio shown in Table 4, operation of stirring and the settle-separation was carried out and the interfacial separation time and nitrogen content as triethylamine in the separated polycarbonate solution were measured. The results are shown in Table 4.

As the reference, the settle-separation was carried out without an inversion. The results are also shown in Table 4.

TABLE 4

| | Concentration of polycarbonate % | Water phase ratio | Inversion | Interfacial separation time (min) | Content (ppm) |
|---|---|---|---|---|---|
| Exp. 4 | 14 | 0.15 + 0.3 | inversion | 2 | 0.11 |
| Ref. 7 | 14 | 0.15 | none | 20 | 3.33 |
| Ref. 8 | 14 | 0.45 | none | 2 | 0.35 |
| Exp. 5 | 12 | 0.15 + 0.3 | inversion | 2 | 0.11 |
| Ref. 9 | 12 | 0.25 | none | 6 | 1.22 |
| Ref. 10 | 12 | 0.45 | none | 2 | 0.30 |
| Exp. 6 | 8.5 | 0.25 + 0.2 | inversion | 2 | 0.07 |
| Ref. 11 | 8.5 | 0.25 | none | 3 | 0.12 |
| Ref. 12 | 8.5 | 0.45 | none | 2 | 0.30 |

In Table 4, N content was measured by Total nitrogen analyzer TN-O1 (manufactured by Mitsubishi Chem. Ind.).

EXAMPLES 7 AND 8 AND REFERENCES 13 TO 16

A purified polycarbonate powder having an average molecular weight of 22,000 was dissolved in methylene chloride to prepare two kinds of polycarbonate solutions having a concentration of 14% or 12%.

Each crude polycarbonate solution (chlorine content of 18 ppm) was prepared by mixing 100 wt. parts of each polycarbonate solution with 0.3 wt. part of 1% aqueous solution of sodium chloride.

In accordance with the process of Example 1 except adding distilled water to each crude polycarbonate solution at each water phase ratio shown in Table 5, operation of stirring and the settle-separation was carried out and the interfacial separation time and chlorine content as sodium chloride in the separated polycarbonate solution were measured. The results are shown in Table 5.

As the reference, the settle-separation was carried out without an inversion. The results are also shown in Table 5.

TABLE 5

| | Concentration of polycarbonate (%) | Water phase ratio | Inversion | Inter facial separation time (min) | Cl content (ppm) |
|---|---|---|---|---|---|
| Exp. 7 | 14 | 0.15 + 0.3 | inversion | 2 | 0.5 |
| Ref. 13 | 14 | 0.15 | none | 2 | 5.5 |
| Ref. 14 | 14 | 0.45 | none | 2 | 5.5 |
| Exp. 8 | 12 | 0.15 + 0.3 | inversion | 2 | 0.5 |
| Ref. 15 | 12 | 0.25 | none | 8 | 0.5 |
| Ref. 16 | 12 | 0.45 | none | 2 | 6.9 |

In Table 5, Cl content was measured by Chloride counter(manufactured by Hiranuma Sangyo K.K.).

EXAMPLE 9

A crude polycarbonate solution (methylene chloride) having a concentration of polycarbonate of 13% and containing bisphenol A (180 ppm) and triethylamine (13 ppm as N content) as impurities obtained by the phosgene method was successively washed with water, with an aqueous solution of acid and with water in the apparatus of FIG. 1.

The stirring vessel was a 15 liter vessel equipped with turbine blades and baffle and an overflow type outlet pipe at the 10 liter level of the contents.

The settler was a 10 liter settler.

(1) Water washing:

The crude polycarbonate solution was fed through the polycarbonate solution inlet pipe (2) into the stirring vessel (1) at a rate of 46 Kg/h. Water was fed through the aqueous washing liquid inlet pipe (3) into the same vessel at a rate of 7 Kg/h. The mixture was stirred at 400 rpm to form a water in oil dispersed phase having a water phase ratio of 0.15.

The dispersion was fed through the overflow type outlet pipe (4) into the stirring vessel (5). Water was fed through the aqueous washing liquid inlet pipe (6) at a rate of 9.6 Kg/h whereby a phase inversion was caused to form an oil in water dispersed phase having a water phase ratio of 0.36.

The dispersion discharged from the overflow type outlet pipe (7) was fed into the settler (8) to separate the phases. The polycarbonate solution was discharged through the outlet pipe (9) and the water phase was discharged through the discharge pipe (10).

(2) Washing with aqueous solution of acid:

An apparatus having stirring vessels and a settler having the same shapes and capacities as the stirring vessels (1), (5) and the settler (8) was used.

In the first stirring vessel, the polycarbonate solution separated in the settler (8) was fed at a rate of 46 Kg/h and 0.15 N-HCl was fed at a rate of 7 Kg/h. The mixture was stirred to form a water in oil dispersed phase having a water phase ratio of 0.15. In the second stirring vessel, 0.15 N-HCl was fed at a rate of 9.6 Kg/h together with the dispersion. The mixture was stirred to cause a phase inversion to form an oil in water dispersed phase having a water phase ratio of 0.36.

The dispersion was discharged through the overflow type outlet pipe and fed into the settler. The phase separation was carried out and the polycarbonate solution was discharged through the bottom outlet pipe and the water phase was discharged through the upper outlet pipe. The water phase had pH of 2.

(3) Water washing:

An apparatus having stirring vessels and a settler having the same shapes and capacities as the stirring vessels (1), (5) and the settler (8) was used.

In the first stirring vessel, the polycarbonate solution obtained in the washing step with the aqueous solution of acid, was fed at a rate of 46 Kg/h and water was fed at a rate of 7 Kg/h. The mixture was stirred to form a water in oil dispersed phase having a water phase ratio of 0.15. In the second stirring vessel, water was fed at a rate of 9.6 Kg/h together with the dispersion. The mixture was stirred to cause a phase inversion to form an oil in water dispersed phase having a water phase ratio of 0.36.

The dispersion was discharged through the overflow type outlet pipe and fed into the settler. The phase separation was carried out and the purified polycarbonate solution was discharged through the bottom outlet pipe at a rate of 46 Kg/h and the water phase was discharged through the upper outlet pipe.

The purified polycarbonate solution had a content of bisphenol A of 12 ppm and a nitrogen content of less than 0.1 ppm and a chlorine content of 0.2 ppm.

What is claimed is:

1. In a method for washing a methylene chloride solution of a polycarbonate obtained by the phosgene method, containing impurities arising from said phosgene method which are soluble in an aqueous washing liquid, the improvement comprising (1) mixing said methylene chloride solution of said polycarbonate from said phosgene method in concentration of 8 to 20 wt.% with a sufficient amount of said aqueous washing liquid to form a water in oil dispersed phase, (2) adding to said mixture from Step (1) a sufficient amount of said aqueous washing liquid to produce a phase inversion from said water in oil dispersed phase into an oil in water dispersed phase, and (3) carrying out a phase separation whereby said methylene chloride solution of the purified polycarbonate is separated from said aqueous washing liquid containing said impurities.

2. A method according to claim 1 wherein the water in oil dispersed phase is formed by mixing the methylene chloride solution of a polycarbonate with 0.01 to 0.45 times by weight of the aqueous washing liquid based on the methylene chloride solution of a polycarbonate.

3. A method according to claim 1 wherein said methylene chloride solution of said polycarbonate prior to Step (1), is mixed with an aqueous washing liquid in sufficient amount to cause a phase inversion from a water in oil dispersed phase into an oil in water dispersed phase and said methylene chloride solution of a polycarbonate is separated.

4. A method according to claim 1, 2 or 3 wherein the aqueous washing liquid is water or an aqueous solution of acid.

5. A method according to claim 1, 2, or 3 wherein the methylene chloride solvent is methylene chloride or a mixed solvent containing methylene chloride.

6. A method according to claim 4, wherein the methylene chloride solvent is methylene chloride or a mixed solvent containing methylene chloride.

7. A method according to claim 1, 2, or 3 wherein said phase separation is carried out by allowing the mixture resulting from Step (2) to stand without agitation.

* * * * *